(12) United States Patent
Doerr (10) Patent No.: US 9,764,659 B2
(45) Date of Patent: Sep. 19, 2017

(54) ICE CAP FOR ELECTRIC CABLE

(71) Applicant: Michael Robert Doerr, Cheswick, PA (US)

(72) Inventor: Michael Robert Doerr, Cheswick, PA (US)

( * ) Notice: Subject to any disclaimer, the term of this patent is extended or adjusted under 35 U.S.C. 154(b) by 86 days.

(21) Appl. No.: 14/986,300

(22) Filed: Dec. 31, 2015

(65) Prior Publication Data

US 2016/0185255 A1 Jun. 30, 2016

Related U.S. Application Data

(60) Provisional application No. 62/098,635, filed on Dec. 31, 2014.

(51) Int. Cl.
*B32B 3/06* (2006.01)
*B60M 1/12* (2006.01)
*H02G 7/16* (2006.01)

(52) U.S. Cl.
CPC ............... *B60M 1/12* (2013.01); *H02G 7/16* (2013.01)

(58) Field of Classification Search
CPC .... Y10T 428/24008; Y10T 428/24198; B60M 1/04; B60M 1/13
USPC .......................................................... 428/99
See application file for complete search history.

(56) References Cited

U.S. PATENT DOCUMENTS

5,456,962 A 10/1995 Weiser

*Primary Examiner* — Alexander Thomas
(74) *Attorney, Agent, or Firm* — Syam Prasad Anand (57) ABSTRACT

Methods and systems for an ice cap to prevent ice buildup on electrical cables or wires such as grooved cables that carry electricity to transportation vehicles are disclosed. The ice caps can be attached to grooved cables or wires and partially envelop them. The ice cap includes an inverted V-shaped structure and a pair of members descending from its apex and configured to form a canopy over the cable while allowing free access to the bottom portion of the cable by a current collector. It provides a cover over the cable allowing run off of rain, snow and sleet. Grooves present on the edges of the descending members disrupt ice buildup on the cable and increase the ice prevention efficiency of the ice cap. Descending members of the ice caps could also extend over neighboring cables to which they do not attach directly to prevent ice formation on them.

15 Claims, 9 Drawing Sheets

ICE CAP FOR ELECTRIC CABLE

PRIORITY PARAGRAPH

This application claims priority to the provisional application No. 62/098,635, filed on Dec. 31, 2014, titled "Ice Cap for Electrical Cable" and is incorporated herein by reference.

BACKGROUND

Ice caps are routinely used to protect electrical cables and wires from ice build-ups caused by rain, sleet and snow. Ice is a poor conductor of electricity. Therefore, its build-up is detrimental to the operation of transportation vehicles such as locomotives, trains, trams, street-cars and trolleys that need to continuously access the cables that are usually placed overhead in order to draw power. The overhead cables usually have grooves that are used for suspending them above transportation vehicles. Generally these grooves are also used to fit ice caps onto these cables. In the ice caps that are available today, water still travels around the edges and reaches the cable, causing ice buildups on these cables during cold weather conditions. This happens in many parts of the world, impairing continuous transfer of electricity to the transportation vehicles and thereby adversely impacting transportation of goods, services and people. Presence of ice on the cable also damages the current collector located on streetcars, electric locomotives, trolley cars, light rail vehicles, heavy rail coaches, combination diesel/electric locomotives, electric buses, trolley buses, trackless trolleys, trains, mining type locomotives and the like. Thus, there is great need for ice caps that can efficiently prevent ice buildup on electric cables.

SUMMARY

Disclosed herein are ice caps, and methods and devices to attach an ice cap to an electric cable. In one embodiment, an ice cap for an electric cable is an inverted V-shaped structure having an apex and a pair of members descending from the apex, and configured to form a canopy over the upper portion of the cable while allowing free access to the bottom portion of the cable by a current collector. Further, the lower surface of each descending member has inward projection configured to snap into the grooves of the cable. Further, the lateral edge of each descending member has a plurality of grooves or channels that prevent water from moving underneath the ice cap.

In another embodiment, an ice cap for a pair of grooved electrical cables includes an inverted V-shaped structure having an apex and a pair of members descending from the apex, and configured to form a canopy over the upper portion of both cables while allowing free access to the bottom portion of both cables by a current collector. The lower surface of each descending member has inward projection configured to snap into the grooves of one of the two cables. Further, the lateral edge of each descending member has a plurality of grooves or channels.

In another embodiment, a method for preventing ice buildup on an electric cable involves providing an ice cap comprising an inverted V-shaped structure having an apex and a pair of members descending from the apex and configured to form a canopy over the upper portion of the cable while allowing free access to the bottom portion of the cable by a current collector. Further, the lower surface of each descending member has inward projection configured to snap into the grooves of the cable, and the lateral edge of each descending member has a plurality of grooves or channels. The method further involves attaching the ice cap to the grooved cable.

In a further embodiment, a kit for preventing ice buildup on an electric cable includes an ice cap having an inverted V-shaped structure having an apex and a pair of members descending from the apex and configured to form a canopy over the upper portion of the cable while allowing free access to the bottom portion of the cable by a current collector. Further, the lower surface of each descending member has inward projection configured to snap into the grooves of the cable, and the lateral edge of each descending member has a plurality of grooves or channels. The kit further includes instructions to install the ice cap.

DETAILED DESCRIPTION

Disclosed herein are ice caps for protecting electrical cables from ice buildup. The electrical cable may be used to power streetcars, electric locomotives, trolley cars, light rail vehicles, heavy rail coaches, combination diesel/electric locomotives, electric buses, trolley buses, trackless trolleys, trains, mining type locomotives and the like. In some embodiments, an ice cap for an electric cable is an inverted V-shaped structure having an apex and a pair of members descending from the apex and configured to form a canopy over the upper portion of the cable while allowing free access to the bottom portion of the cable by a current collector.

Figure 1A:
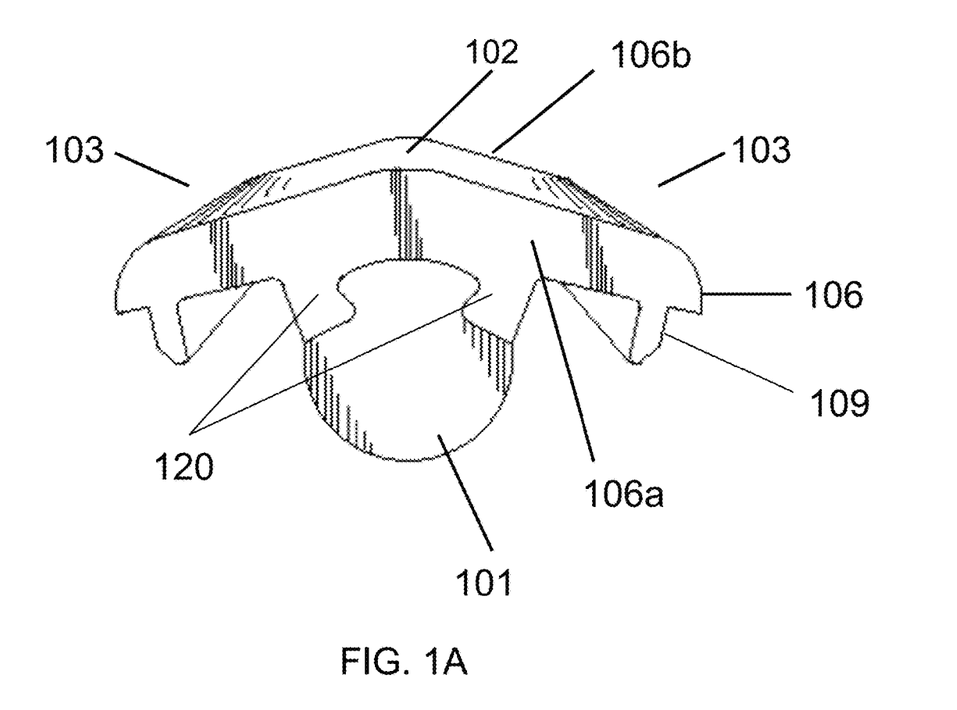
FIGS. 1A-C illustrate an ice cap mounted on a grooved electric cable. (A) shows an ice cap in the form of a canopy over a grooved electric cable. (B) and (C) depict cross sections of ice cap with grooves 107/108 on the lateral edge 106, and mounted on a grooved cable according to an embodiment.

FIG. 1A shows an ice cap in the form of an inverted V-shaped structure mounted on a grooved electric cable 101. The ice cap has an apex 102 with two descending members 103. The descending members 103 form a canopy over the cable and allows water, ice, snow and sleet to fall clear of the cable. By extending sideways away from the cable, the descending members act as eaves. The lower surface of each descending member has an inward projection 120 that is configured to snap onto the grooves of the cable while allowing free access to the bottom portion of the cable by a current collector. Further, each descending member 103 has a front edge 106a, a back edge 106b, and a lateral edge 106.

Figure 1B:
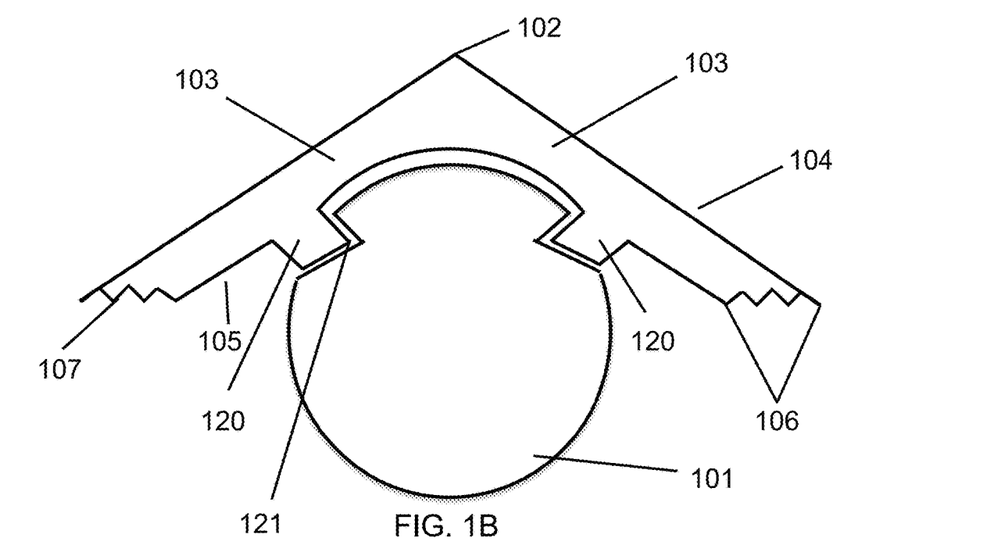

FIG. 1B shows the cross-section of an ice cap attached to a grooved electric cable 101. Cable 101 is usually copper, but sometimes may also be of steel, silver, gold, aluminum, or any metal that conducts electricity. The ice cap may be an inverted V-shaped structure having an apex. The apex may be pointed 102 as in FIG. 1B or rounded 302 as in FIG. 3A. A pair of members 103 descends from the apex. The descending members 103 may have a thickness in the range of about $1/18^{th}$ of an inch to about 3 inches, about $1/6^{th}$ of an inch to about 3 inches, about $1/4^{th}$ of an inch to about 3 inches, about $1/2^{th}$ of an inch to about 3 inches, about 1 inch to about 3 inches. The descending members 103 form a canopy over the cable and allows water, ice, snow and sleet to fall clear of the cable. By extending sideways away from the cable, the descending members act as eaves. Descending members have an upper surface 104 and a lower surface 105. The lower surface 105 of the descending members has inward projection 120 that is configured to snap onto the grooves 121 of the cable while allowing free access to the bottom portion of the cable by a current collector. The inward projection 120 may be continuous along the length of the ice cap or may be discontinuous. This arrangement would not impede current collection by current collectors located on streetcars, electric locomotives, trolley cars, light rail vehicles, heavy rail coaches, combination diesel/electric locomotives, electric buses, trolley buses, trackless trolleys, trains, mining type locomotives and the like. Since the ice caps do not circumferentially engage the cable they also prevent damage to the current collectors that have to slide along the bottom portion of the cables to continuously access it in order to draw power in an uninterrupted manner.

Figure 1C:
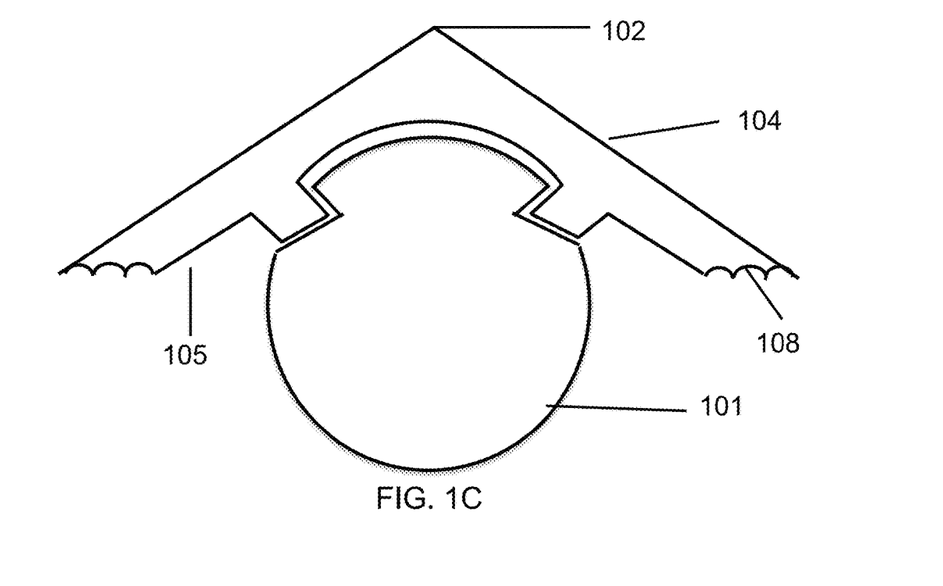
Figure 7:
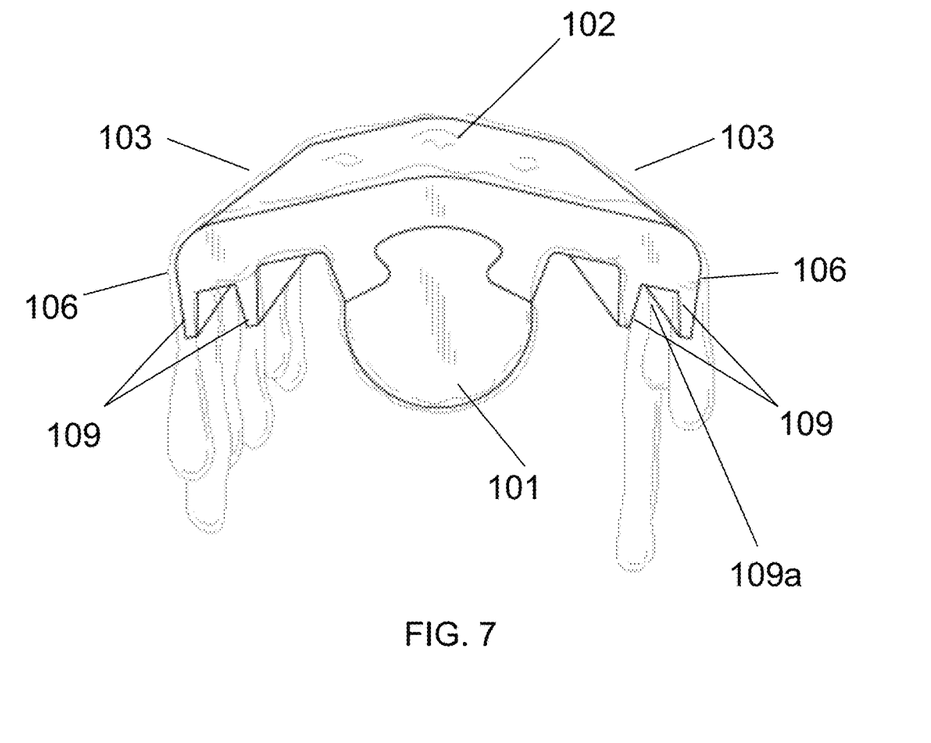
FIG. 7 shows an ice cap with downward projections 109 present on the lateral edge of each descending member, according to an embodiment.

The lateral edge 106 of each descending member 103 may have one or more grooves. The grooves may be inverted (upside down) V-shaped 107 as shown in FIG. 1B or inverted (upside down) U-shaped 108 as shown in FIG. 1C. In some embodiments, the grooves may also be in other shapes, such as with square edges as shown in FIG. 7. The grooves may be 1, 2, 3, 4, 5, or 6 in number. The depth of the grooves may be about 0.05 inch to about 1 inch. The width of the grooves may be 0.05 inch to about 2 inches. The grooves may prevent water from travelling around and underneath the edges and reaching the cable. The grooves may act like water channels and by inhibiting the flow of water along under surface of the descending member, may increase the efficiency of the edges that otherwise function as simple eaves. The grooves on the lateral edge may be continuous and run along the entire length of the ice cap. In some embodiments, the grooves may be discontinuous.

Figure 2A:
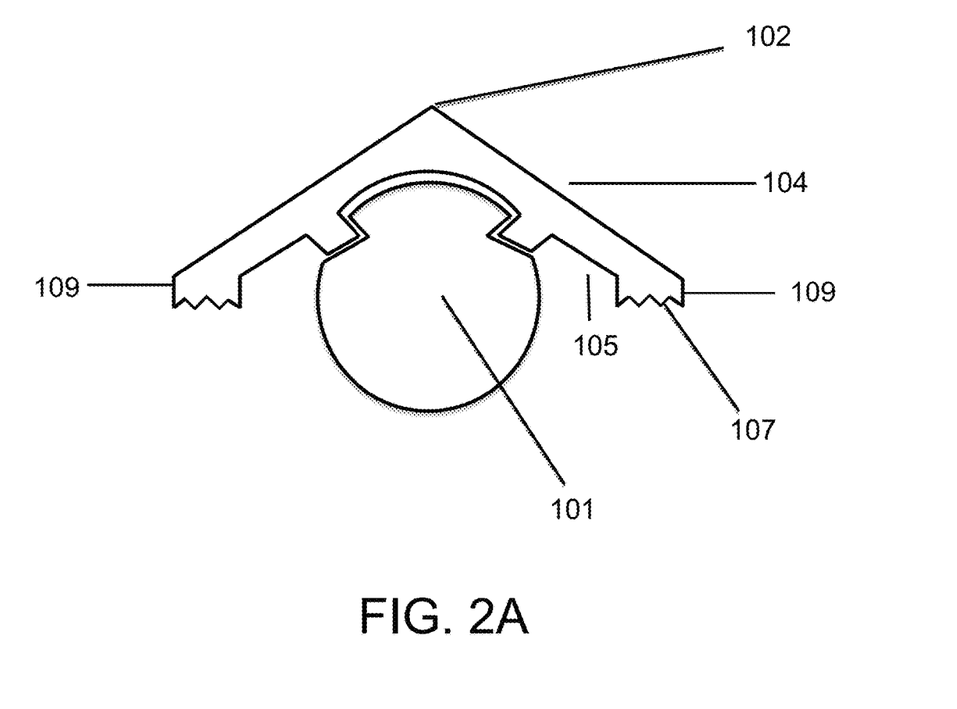
FIGS. 2A-B depict cross sections of ice cap with downward projections 109 present on the lateral edge of each descending member, and mounted on a grooved cable according to an embodiment.
Figure 2B:
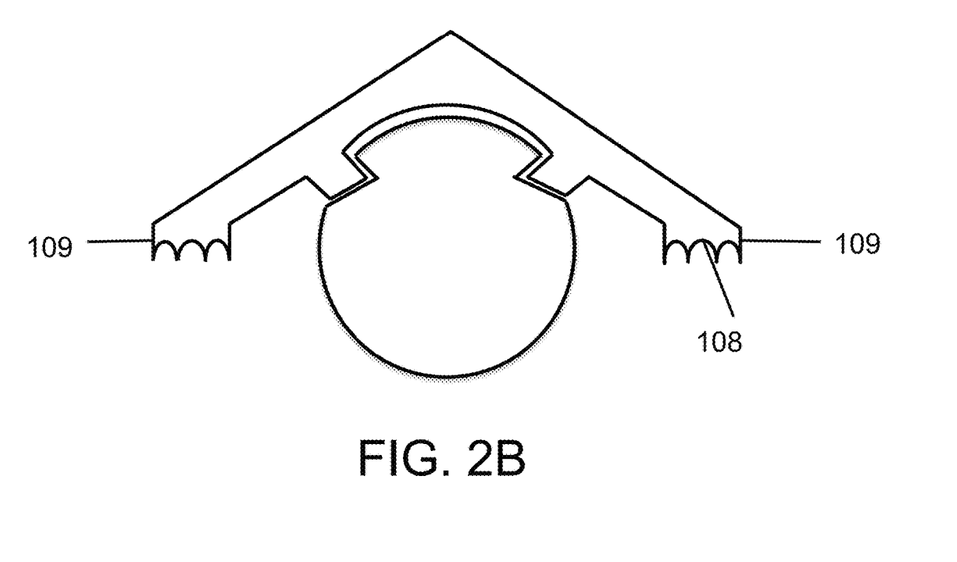

In some embodiments, the lateral edge of the descending members may extend downward to form downward projection 109 as shown in FIG. 1A or FIGS. 2A-B. The downward projections may have one or more grooves, which may be inverted V-shaped 107 or inverted-U shaped 108 (FIGS. 2A-B). In some embodiments, the grooves may also be in other shapes, such as with square edges 109a (FIG. 7). The grooves 107/108 on the downward projections may run along the entire length of the ice cap. In some embodiments, the downward projection 109 may be present extending from the undersurface of the descending member, in close proximity to the lateral edge, as shown in FIG. 1A.

Figure 3A:
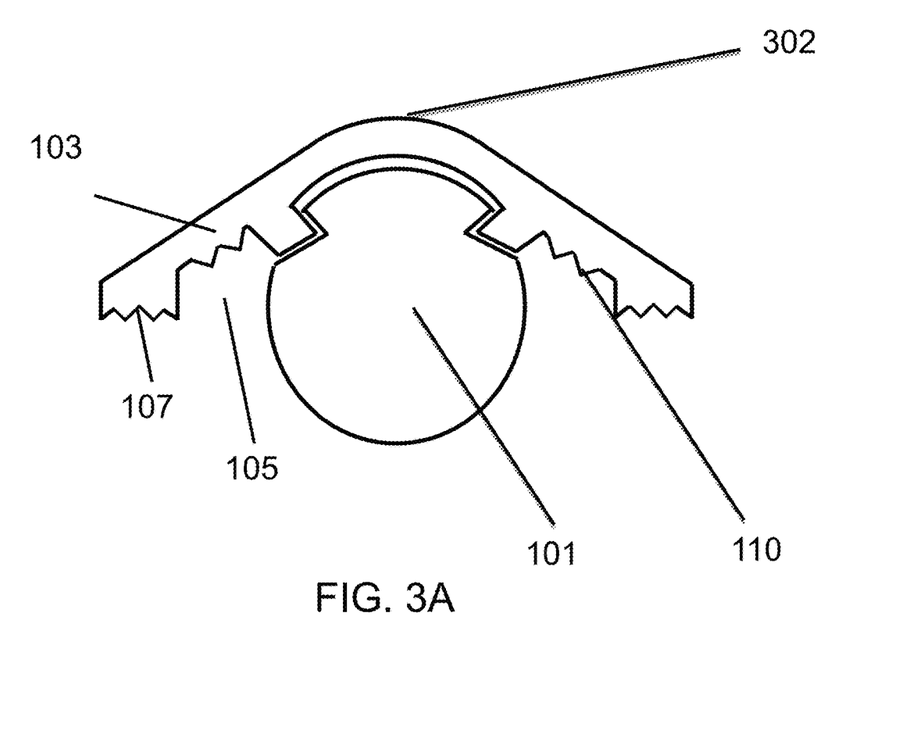
FIGS. 3A-B show cross sections of ice cap with grooves 110/111 on the lower surface of the descending members, and mounted on a grooved cable according to an embodiment.
Figure 3B:
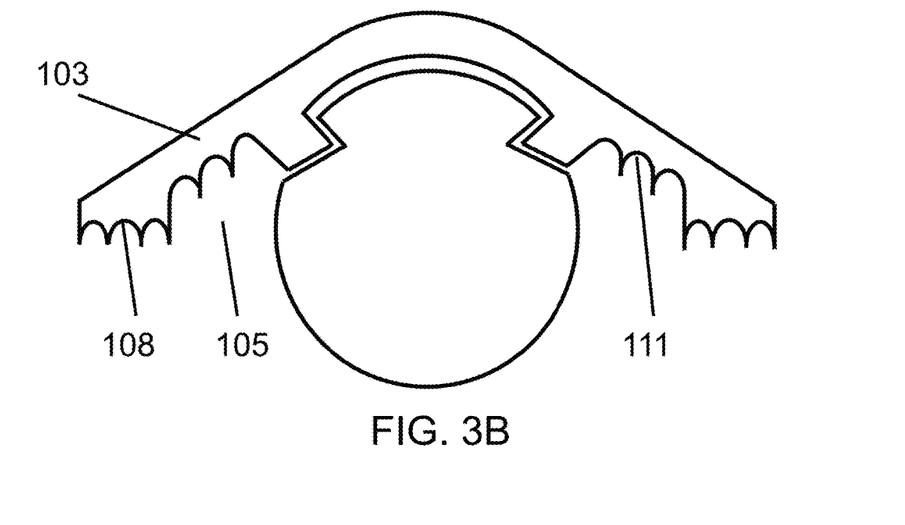

In some embodiments, the lower surface 105 of each descending member 103 may additionally contain one or more grooves. The grooves may be inverted V-shaped 110 or inverted-U shaped 111 as shown in FIGS. 3A-B. These additional grooves could stop water or moisture that escapes the grooves 107 or 108 on the lateral edge and increase the efficiency of the ice cap. The grooves 110 or 111 on the lower surface may be continuous and run along the length of the ice cap. In some embodiments, the grooves 110 or 111 may be discontinuous. The grooves may be from 2 to 20 in number. The depth of the grooves may be about 0.05 to about 1 inch. The width of the grooves may be from about 0.05 inch to about 2 inches.

Figure 4:
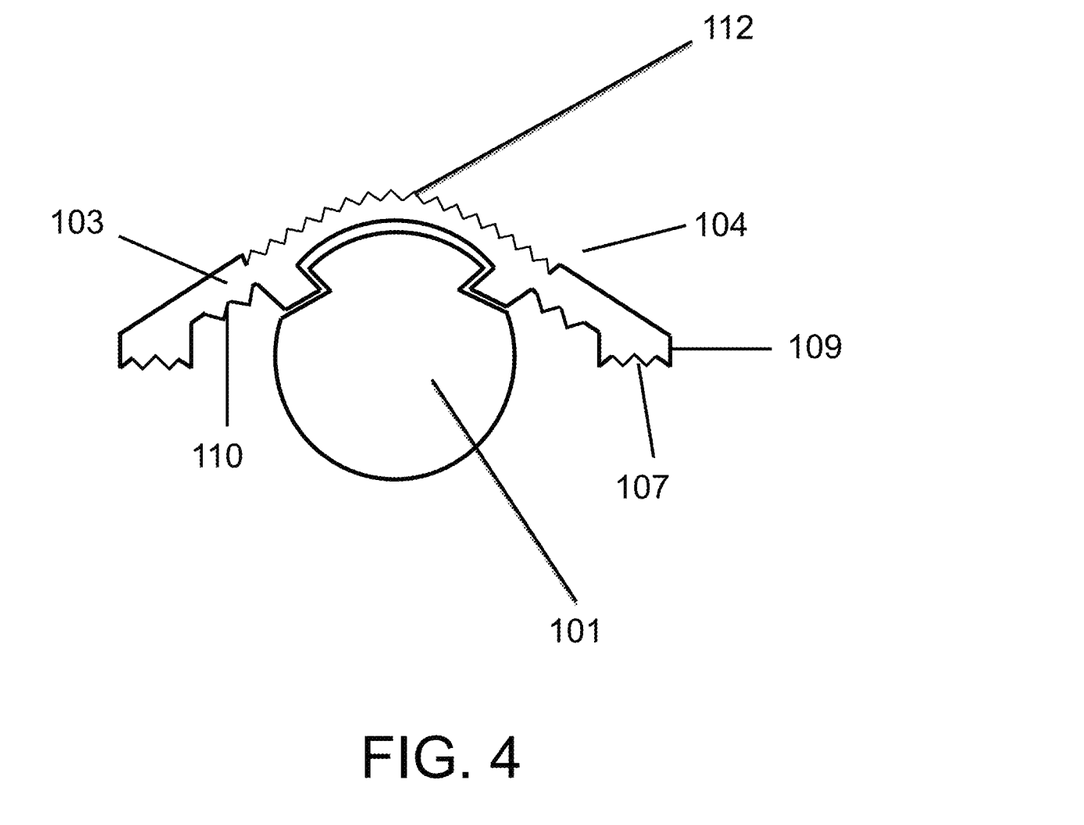
FIG. 4 shows a cross section of an ice cap with grooves 112/110 on both upper and lower surface of the descending members, and mounted on a grooved cable according to an embodiment.

In some embodiments, the upper surface 104 of each descending member 103 may contain major and minor grooves, or any combination thereof. FIG. 4 illustrates an embodiment in which the ice cap has additional minor grooves 112 on the apex and the upper surface of the descending members. In this exemplary embodiment, there are sixteen minor grooves 112 on the apex and the upper surface of an ice cap. Their number could vary from 2 to 20 in other embodiments. These grooves may be present on upper surface of both the descending members or may be present on the upper surface of one of the descending members. The minor grooves 112 on the upper surface may be continuous and run along the entire length of the ice cap. In some embodiments, the minor grooves 112 on the upper surface may be discontinuous along the length of the ice cap and curved towards the lateral edge for allowing water to run-off. These additional grooves could collect water on the top of the ice cap and channel it away towards the lateral edges for water to run-off instead of allowing droplets or tiny particulates to accumulate on the upper surface of the ice cap. They could increase the efficiency of the ice cap.

Figure 5A:
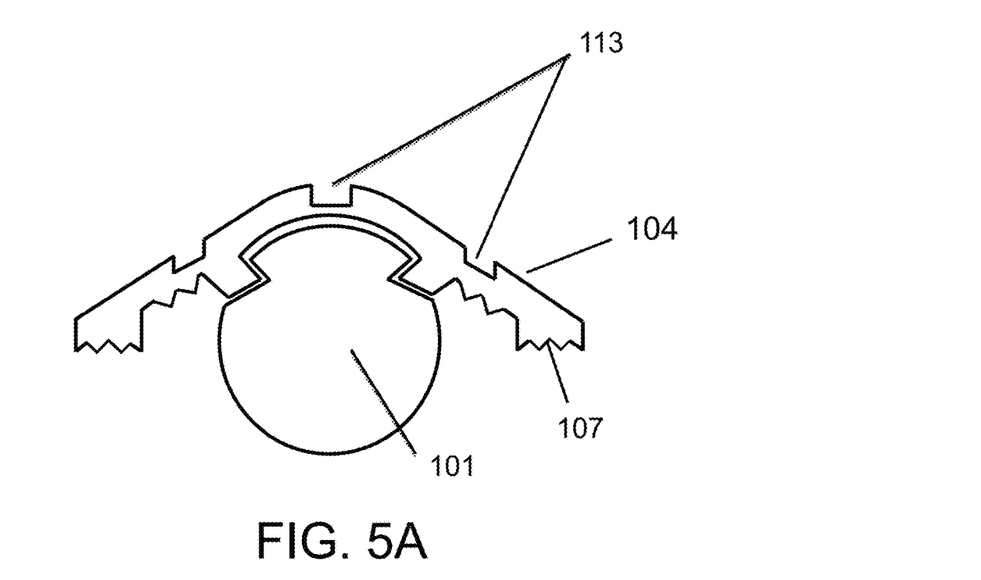
FIGS. 5A-B show cross sections of ice cap with major grooves 113 on upper surface of the descending members, and mounted on a grooved cable according to an embodiment.
Figure 5B:
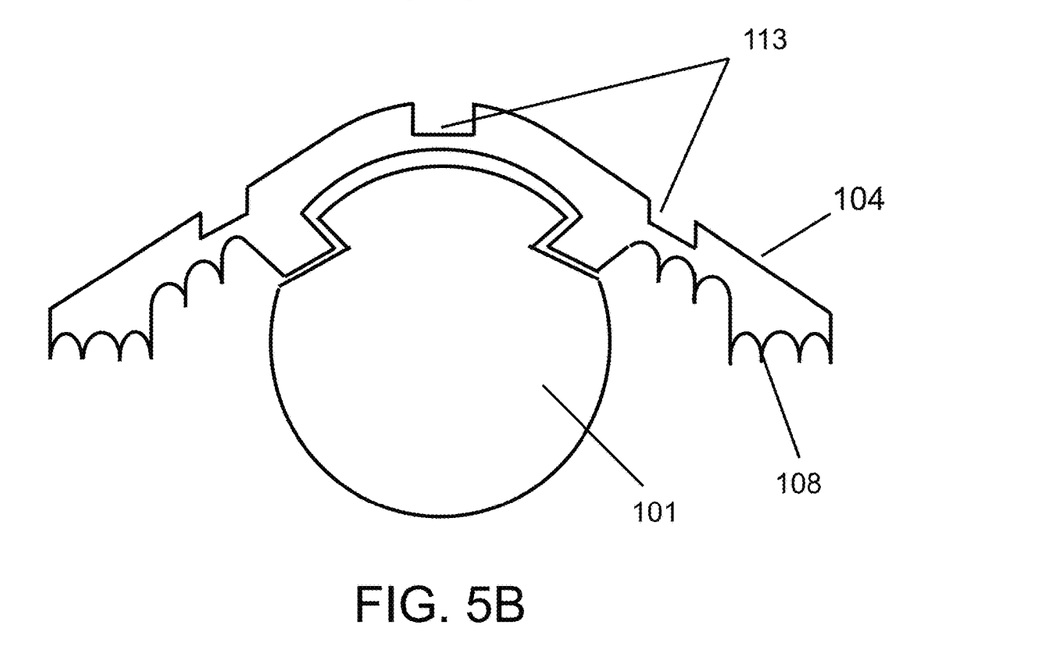

In some embodiments, the upper surface 104 may contain one or more major grooves 113 as shown in FIGS. 5A-B. FIG. 5A illustrates an embodiment in which the ice cap has grooves 113 on the apex and the upper surface of the descending members. These grooves are about 0.05 to about 2 inches in depth, and about 0.05 inch to about 3 inches in width. In the embodiment shown in FIG. 5A, there is one major groove on the apex and one major groove on the upper surface of each descending member. In other embodiments, there could be 2-6 major grooves on each descending member and 2-6 grooves on the apex. The major grooves 113 on the upper surface may be continuous and run along the entire length of the ice cap. In some embodiments, the major grooves 113 on the upper surface may be discontinuous along the length of the ice cap and are curved towards the lateral edge for allowing water to run-off. The grooves could collect water on the top of the ice cap and channel it away to the edges instead of allowing it to accumulate on the upper surface of the ice cap. They could increase the efficiency of the ice cap.

The ice cap disclosed herein may cover a portion of the upper surface of the cable 101 and the surface of the cable covered by the ice cap can be 10 percent of the cable's surface or more, depending on the operation for which the cable is used and the strength that is required for stably attaching the ice cap under various operating conditions. In some embodiments, the ice cap may have a length of about 3 feet to about 20 feet, about 5 feet to about 20 feet, about 8 feet to about 20 feet, or about 12 feet to about 20 feet. The width of the ice cap (distance between the lateral edges of the two descending members) may be about 3 inches to about 18 inches, about 5 inches to about 18 inches, about 7 inches to about 18 inches, or about 9 inches to about 18 inches.

The ice cap is generally a solid structure and made from a polymer, such as a polyurethane, a polyester, an epoxy resin, a phenolic resin, polyethylene (PE), polypropylene (PP), polyvinyl chloride, polystyrene, or any combination thereof. The ice cap may be prepared from the polymers disclosed herein by melt blending or melt compounding the individual components using any screw type compounding extruder known in the art. In some embodiments, the polymer composition may further contain antioxidants, colorants, UV protectors, fungicides, compatibilizers, or any combination thereof. The resulting plastic may be molded into an inverted V-shaped ice cap.

In other embodiments, the ice cap can be a composite structure and may be formed by assembly of the constituent elements to give a final structure. For example, individual descending members 103 may be joined together to form a functional ice cap. Further, the inward projections 120 may also be attached to the lower surface of the descending member. Furthermore, the grooves 107 on the lateral edge may also be attached. Assembly of the ice cap from its constituent elements could allow the use of chemically distinct materials for different areas of the ice cap. Additionally, such composite structure may allow replacement of damaged grooves 107 on the lateral edge without replacing entire ice cap resulting in cost savings.

Figure 6:
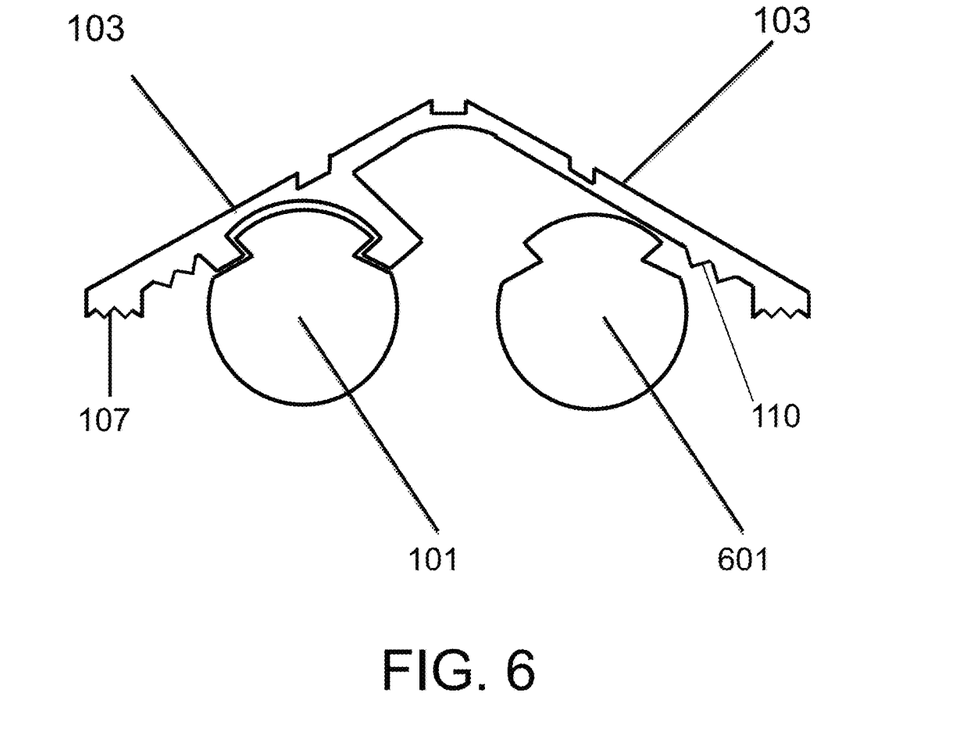
FIG. 6 shows a cross section of an ice cap forming canopy over a pair of grooved cables according an embodiment.

In some embodiments, the ice cap may form a canopy over one or more grooved electrical cables. FIG. 6 illustrates an embodiment in which the ice cap forms a canopy over a pair of cables 101 and 601, but is attached to one of the cables 101. One of the descending members 103 of the ice cap attaches to one of the cables 101. The second descending member 103 extends over the neighboring cable 601 and forms a canopy over that cable without attaching to it. The attachment of the ice cap can be interchanged between the two cables when required. The ice cap may further have grooves 107 on the lateral edge, and grooves 110 on the lower surface of each descending member. This embodiment gives the advantage of preventing ice formation of two cables, while attaching the ice cap to only one cable. In another embodiment, an ice cap may form a canopy over three grooved electrical cables.

An exemplary embodiment of an ice cap is shown in FIG. 7. The ice cap has an apex 102 with a pair of descending members 103. The lateral edge 106 of each descending member has a downward projection 109. The downward projection 109 has a single major groove 109a with square shaped edges. The downward projection 109 and the groove 109a may prevent water from flowing underneath the descending member and prevent buildup of ice on the electric cable 101. Further, the ice caps disclosed herein can withstand wind gusts of about 25 mph, 50 mph, 75 mph, 85 mph, 100 mph, 125 mph, 150 mph, and the like, without being detached from the electrical cable.

Also disclosed herein are methods to prevent ice formation on grooved electric cables. In one embodiment, a method involves providing an ice cap comprising an inverted V-shaped structure having an apex and a pair of members descending from the apex and configured to form a canopy over the upper portion of the cable while allowing free access to the bottom portion of the cable by a current collector, a lower surface of each descending member having inward projection configured to snap into the grooves of the cable, and the lateral edge of each descending member having a plurality of grooves. The method further involves attaching the ice cap to the grooved cable. The ice cap may be snapped into the groves of the cable with force, by pushing, tapping, or gently hammering the ice cap. The inward projection 120 will snugly fit into the groove of the cable. The shape of the inward projection 120 may be complimentary to the shape of the groove 121 on the cable (FIG. 1B).

In other embodiments, the method involves providing different parts of the ice cap and assembling them to form a composite structure. Several ice caps may be placed on the cable end-to-end. Placement of several lengths of ice caps adjacent to each other along the entire length of the cable prevents ice formation on the entire cable.

Also disclosed herein are kits to prevent ice formation on grooved electric cables. In a further embodiment, a kit for preventing ice buildup on an electric cable includes an ice cap having an inverted V-shaped structure having an apex and a pair of members descending from the apex and configured to form a canopy over the upper portion of the cable while allowing free access to the bottom portion of the cable by a current collector, a lower surface of each descending member having inward projection configured to snap into the grooves of the cable, and the lateral edge of each descending member having a plurality of grooves. The kit further includes instructions to install the ice cap. The kit may also include instructions to assemble the ice cap from individual components to form a composite structure.

While preferred embodiments have been shown and described, various modifications and substitutions may be made thereto without departing from the spirit and scope of the method and device. Accordingly, it is to be understood that the present method and device has been described by way of illustration and not limitation.

EXAMPLE 1

Figure 8A:
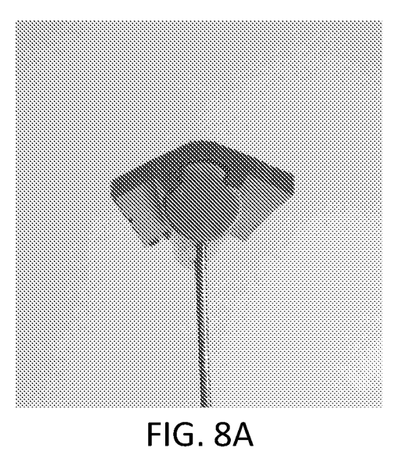
FIGS. 8A-D demonstrate the results of an experiment, showing ice buildup on an electric cable that were fitted with ice caps without grooves and downward projections on the lateral edge. Cable fitted with ice cap having grooves and downward projections on the lateral edge of each descending member displayed very less buildup of ice.
Figure 8B:
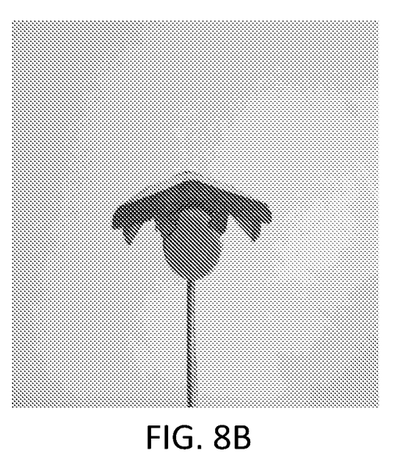
Figure 8C:
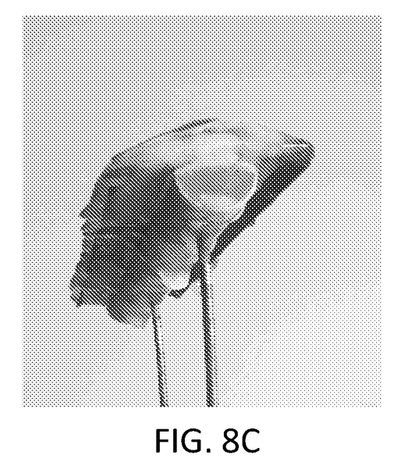
Figure 8D:
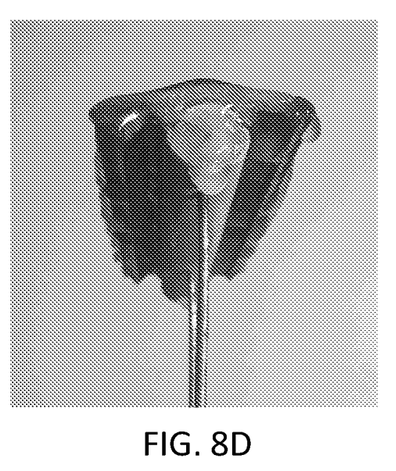

An ice cap with downward projections on the lateral edge of the descending member (FIG. 8B) and an ice cap without downward projections (FIG. 8A) on the lateral edge were attached to a grooved electric cable. Water was sprayed on both the ice caps to simulate rain. To simulate windy conditions, ice caps were exposed to a fan. The ice caps were maintained under freezing conditions to facilitate formation of ice. Surprisingly, the ice cap with downward projections on the lateral edge prevented ice buildup underneath the ice cap and on the electric cable (FIG. 8D). The ice cap without downward projections displayed ice buildup underneath the ice cap and on the cable (FIG. 8C). The downward projections present on the lateral edge prevented the water from moving underneath the ice cap and forming ice on the electric cable.

What is claimed is:

1. An ice cap for a grooved electrical cable, the ice cap comprising:
   an inverted V-shaped structure having an apex and a pair of members descending from the apex and configured to form a canopy over the upper portion of the cable while allowing free access to the bottom portion of the cable by a current collector;
   a lower surface of each descending member having inward projection configured to snap into the grooves of the electrical cable; and
   a lateral edge of each descending member having one or more grooves.

2. The ice cap of claim 1, wherein the lateral edge of each descending member further comprises downward projections, the downward projections further comprising one or more grooves.

3. The ice cap of claim 1, wherein the thickness of each descending member is about $1/8^{th}$ of an inch to about 2 inches.

4. The ice cap of claim 1, wherein the length of the ice cap is about 3 feet to about 20 feet.

5. The ice cap of claim 1, wherein the width of the ice cap is about 3 inches to about 12 inches.

6. The ice cap of claim 1, wherein the grooves on the lateral edge of each descending member are continuous along the entire length of the ice cap.

7. The ice cap of claim 1, wherein each descending member further comprises a plurality of grooves on the lower surface, a plurality of grooves on the upper surface, or a combination thereof.

8. The ice cap of claim 7, wherein the grooves on the upper surface of the descending member are continuous along the entire length of the ice cap.

9. The ice cap of claim 7, wherein the grooves on the lower surface of the descending member are continuous along the entire length of the ice cap.

10. The ice cap of claim 7, wherein the grooves on the upper surface of the descending member are discontinuous along the length of the ice cap and are curved towards the lateral edge for allowing water to run-off.

11. The ice cap of claim 1, wherein the ice cap is made of a polyurethane, a polyester, an epoxy resin, a phenolic resin, polyethylene (PE), polypropylene (PP), polyvinyl chloride, polystyrene, or any combination thereof.

12. The ice cap of claim 11, wherein the ice cap further comprises antioxidants, colorants, UV protectors, fungicides, compatibilizers, or any combination thereof.

13. The ice cap of claim 1, wherein the ice cap is a composite structure formed by assembly of various members to produce a functional ice cap.

14. An ice cap for a pair of grooved electrical cables, the ice cap comprising:
    an inverted V-shaped structure having an apex and a pair of members descending from the apex and configured to form a canopy over the upper portion of both cables while allowing free access to the bottom portion of both cables by a current collector;
    a lower surface of each descending member having inward projection configured to snap into the grooves of one of the two cables; and
    a lateral edge of each descending member having a plurality of grooves.

15. A kit for preventing ice buildup on a grooved electric cable, the kit comprising:
    an ice cap having an inverted V-shaped structure having an apex and a pair of members descending from the apex and configured to form a canopy over the upper portion of the cable while allowing free access to the bottom portion of the cable by a current collector, a lower surface of each descending member having inward projection configured to snap into the grooves of the cable, and a lateral edge of each descending member having a plurality of grooves; and
    instructions to install the ice cap.

* * * * *